United States Patent [19]

Viazzi

[11] 3,730,562
[45] May 1, 1973

[54] PIPE JOINT CONNECTING SMOOTH-ENDED PLASTIC PIPES FOR UNDERWATER USE

[75] Inventor: Pierre Viazzi, Bormes Les Mimosas, France

[73] Assignee: Societe Internationale D'Application De Procedes Industriels (S.I.A.P.I.), Panama, Panama

[22] Filed: Nov. 22, 1971

[21] Appl. No.: 201,066

[30] Foreign Application Priority Data

Dec. 22, 1970 Switzerland .............................. 19,025
June 9, 1971 Switzerland ............................... 8,420

[52] U.S. Cl. ................... 285/110, 285/114, 285/364, 285/369, 285/381
[51] Int. Cl. .............................................. F16l 17/00
[58] Field of Search ...................... 285/114, 288, 420, 285/369, 236, 425, 110, 364, , 381

[56] References Cited

UNITED STATES PATENTS

| | | | |
|---|---|---|---|
| 3,667,782 | 6/1972 | Viazzi | 285/369 |
| 2,496,667 | 2/1950 | Hopwood | 285/114 X |
| 3,479,066 | 11/1969 | Gittleman | 285/236 |
| 3,252,192 | 5/1966 | Smith | 285/114 X |
| 3,206,229 | 9/1965 | Kramer | 285/114 |
| 1,652,418 | 12/1927 | Sherrerd | 285/288 |
| 1,451,731 | 4/1923 | Higdon | 285/288 |

FOREIGN PATENTS OR APPLICATIONS

| | | | |
|---|---|---|---|
| 1,007,746 | 10/1965 | Great Britain | 285/114 |
| 159,741 | 4/1933 | Switzerland | 285/114 |
| 1,181,508 | 11/1964 | Germany | 285/114 |
| 557,896 | 5/1958 | Canada | 285/425 |

Primary Examiner—Thomas F. Callaghan
Attorney—Irvin S. Thompson et al.

[57] ABSTRACT

A pipe joint connecting smooth-ended plastic pipes for underwater use, comprises a sleeve of resilient material fitted on the adjacent smooth ends of two plastic pipes. The sleeve has, at each of its ends, a circular throat having, in longitudinal section, a concave portion bounded by two lips, the edges of the lips being disposed on circles of smaller diameter than the outside diameter of the pipes in the undeformed condition of the lips, the lips being in contact with and resiliently deformed by the outer surface of the pipes. The sleeve has at its central zone a portion of a thickness greater than the thickness of the sleeve adjacent the lips, this thickened portion having an inner cylindrical surface of circular cross section having a diameter corresponding to the outside diameter of the pipes and contacting the outer surface of the pipes on either side of the zone in which the pipes most closely approach each other. The resilient sleeve is housed in a casing, and readily detachable coupling means releasably retain the pipe ends in the sleeve, these coupling means comprising abutments secured to each pipe and in contact with opposite ends of the casing. The distance separating the frontal face of each abutment and the end of the corresponding pipe is less than half the length of the casing but greater than half the length of the casing diminished by half the length of the central thickened portion of the sleeve. The coupling means further comprise members detachably bearing against and interconnecting surfaces of the abutments on the pipes which are remote from the casing.

5 Claims, 8 Drawing Figures

PIPE JOINT CONNECTING SMOOTH-ENDED PLASTIC PIPES FOR UNDERWATER USE

The present invention has for its object the provision of a fitting for the coupling of pipes and more particularly of pipes intended to constitute immersed ducts or undersea ducts for pumping sewage out to sea.

For the realization of such ducts it is advantageous to use plastic material pipes due to their lightness and their resistance to the chemical agents particularly to salt water. The use of pipes of plastic material has however an important drawback, the necessity to make glued joints which cannot be made in the water or even if the pipes are wet or damp.

The present invention has for its object the provision of a fitting for the coupling of pipes having smooth ends, particularly made of plastic material, comprising a sleeve in resilient material surrounding the adjacent ends of two pipes caracterized by the fact that the sleeve has at each of its ends a peripheral groove constituting a draft hole and presenting in longitudinal cross section a concave portion limited by two lips, the edges of which define apertures smaller than the outside dimensions of the pipes to be coupled and intended to enter in contact with, and to be deformed resiliently by the outside surface of the pipes, by the fact that this sleeve has in its central part a thicker portion having a cylindrical internal surface the cross section of which corresponds to the outside dimensions of the pipes to be coupled and intended to enter in contact with the parts of these pipes extending on either side of the plan of the joint and by the fact that it comprises mechanical locking means of both pipes the one with respect to the other.

The attached drawings show schematically by way of example several embodiments of the present invention.

FIG. 1 shows the first embodiment of the fitting mounted on the adjacent smooth ends of two pipes 1, 2 for example made out of plastic material.

Figure 1:
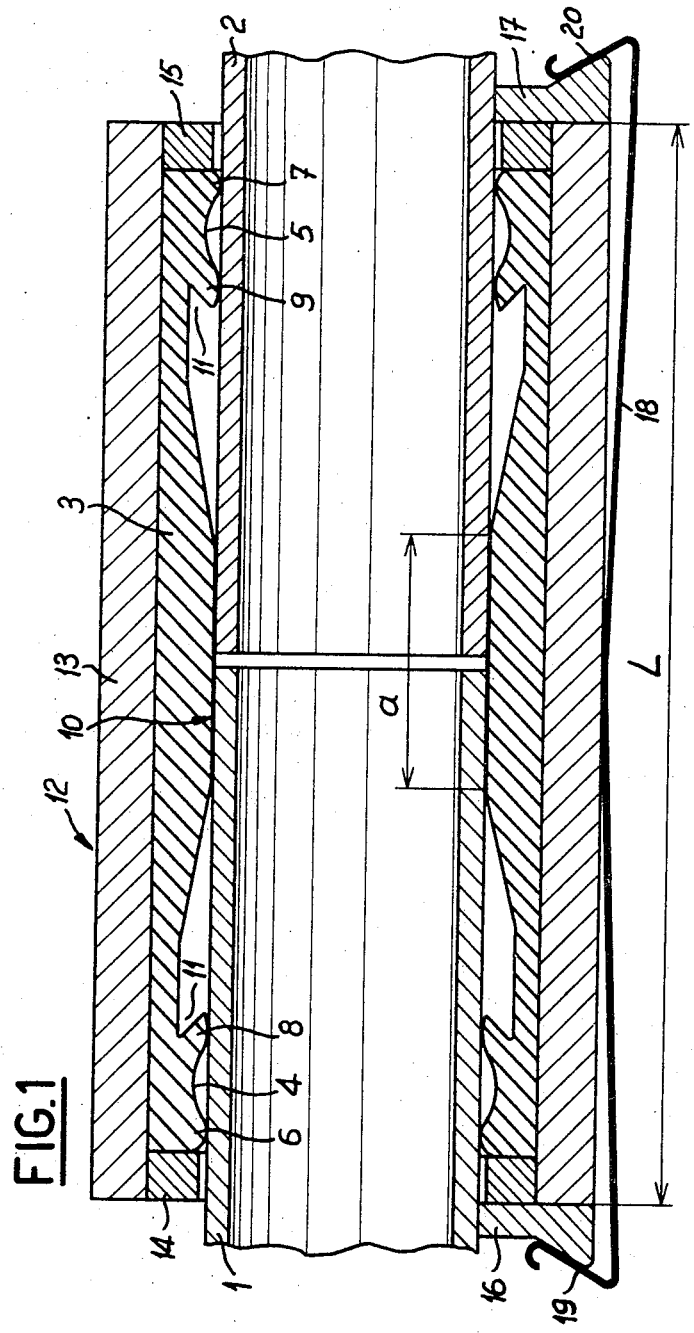
FIG. 1 is a longitudinal cross section of a first embodiment of the fitting.

This fitting comprises a sleeve of resilient material 3, such as neoprene, which comprises near each of its ends a peripheral groove 4, 5 constituting a draft hole and which are limited by outside lips 6, 7 and inside lips 8, 9 applied, when the fitting is in service position, resiliently against the outside wall of the pipes 1, 2.

This sleeve comprises in its central part a thickening 10 presenting a cylindrical internal surface the cross section of which corresponds to the outside dimensions of the pipes 1, 2 to be coupled and intended to enter in contact with the portion of the pipes extending on either side of the plane of the joint.

In the realization shown the inside lips 8, 9 have greater length than the outside lips 6, 7 so that a cavity 11 is provided between each internal lip 8, 9 and the wall of the sleeve 3.

The outside grooves 4, 5 constituting a draft hole insures at the fitting in place of the sleeve on the pipes, a tightness at zero gauge pressure and even at negative pressures.

The outside lips 6, 7 slide easily onto the pipes and give a first air tightness, permitting the setting under vacuum of the draft hole. This setting under vacuum happens when the pipe reaches the inside lips 8, 9 increasing the volume of the air chamber.

The resilient sleeve is first mounted in a casing 12 in order to constitute only one composite element which is slipped onto the end of the pipes 1, 2.

The casing 12 is constituted by a tubular element 13, on which are fastened, particularly soldered, washers 14, 15 constituting shoulders to receive the resilient sleeve 3. The tubular element 13 and the washers 14, 15 are preferably realized in plastic material but could be metal. The casing 12 may also be made in only one part. A certain clearance exits between the washers 14, 15 and the pipes 1 and 2 respectively so that the fitting is in contact with the pipes 1, 2 only by the lips 6, 7, 8 and 9 and by the central portion 10.

Such fitting as well as variants of them have been described in detail in my U.S. Pat. No. 3,667,782. They present a drawback: the fact that the pipes 1, 2 are free to displace axially the one with respect to the other. This is particularly bad in the use of submarine ducts or underwater ducts. As a matter of fact it is not possible to assemble the whole ducts or a section of it, and then bring it by pulling it by one of its end up to the place where it has to be used.

To avoid this drawback the present fitting comprises further mechanical locking means of the two pipes the one with respect to the other. The locking means enable on the one hand to fix the axial position of the pipes 1, 2 the one with respect to the other, and on the other hand to avoid axial relative displacement between the fitting and the pipes 1, 2 of a sufficient amplitude so that the plan of the joint, that is the end of the pipes, escapes from the central thickening of the fitting.

In the embodiment shown in FIG. 1 these locking means comprise a pair of abutment 16, 17 and a coupling member 18 for each of these pairs. The abutments 16, 17 are fastened, for example soldered, to the pipes 1, 2 respectively and are disposed in the same radial plan with respect to these pipes. The number of pairs of abutments 16, 17 may be 3 to 6 for example or even greater and are uniformly distributed about the periphery of the pipes 1, 2.

The distance separating each abutment 16 or 17 from the end of the corresponding tube 1 or 2 located within the fitting is less than half the length L of the fitting, but greater than half of the length L of the fitting diminished by the half of the length $a$ of the central thickening 10.

In this way when these abutments 16, 17 are in contact with the washers 14, 15 respectively of the casing 12, the ends of the pipes 1, 2 located within the fitting are necessarily in contact with their external peripheral surfaces with the central thickening 10 of the sleeve 3 which insures the good working of the fitting.

The abutments 16, 17 have a height approximately equal to the difference between the radius of the casing 12 and one of the pipes 1, 2 and present, on their free faces, an inclined contour.

The coupling member 18 is constituted by a blade of spring steel slightly curved and the ends of which 19, 20 are bent to be hooked in service position against the inclined contours of the abutments 16, 17. The dimensions of the coupling member are such that it applies firmly the abutments 16, 17 against the casing 12.

Once each pair of abutments 16, 17 is connected by means of the coupling member, the axial position of the pipes the one with respect to the other as well as with respect to the casing 12 is determined. It is thus possible to exert traction on the pipes 1, 2 without drawing their ends out of the sleeve 3 which ensures the tightness of their coupling.

These coupling members may have different shapes as shown in FIGS. 2 to 5 but always they ensure the tightening of the axial position of the pipes between themselves and with respect to the sleeve 3 or to the casing 12.

Figure 2:
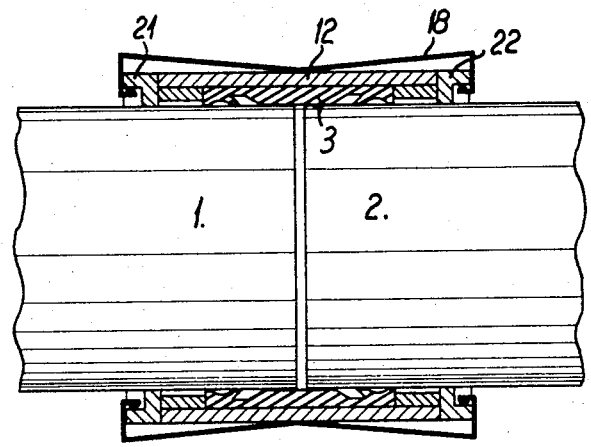
FIG. 2 shows a second embodiment of the fitting.

In the embodiment shown in FIG. 2 the pairs of abutment 16, 17 are replaced by rings 21, 22 respectively fast with the pipes 1 and 2. The coupling member 18 presents ends which are folded twice to rest in the grooves constituted by the rings 21 and 22.

Figure 3:
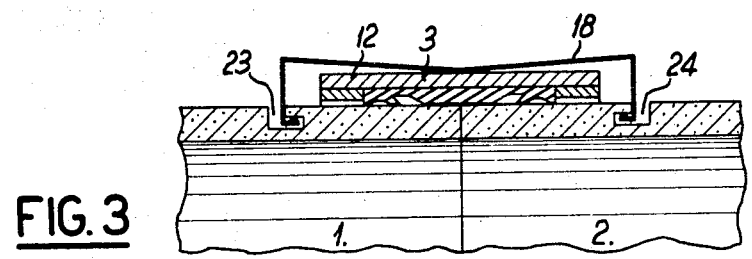
FIG. 3 is a partial cross section of a third embodiment of the fitting.

In the embodiment shown in FIG. 3, the coupling member 18 rests in grooves 23, 24 provided in the peripheral wall of the pipes 1, 2. In this realization the ends of the pipes are maintained in contact one with the other and the axial position of the sleeve 3 and of the casing 12 is maintained by friction, the coupling member 18 resting on this casing.

Figure 4:
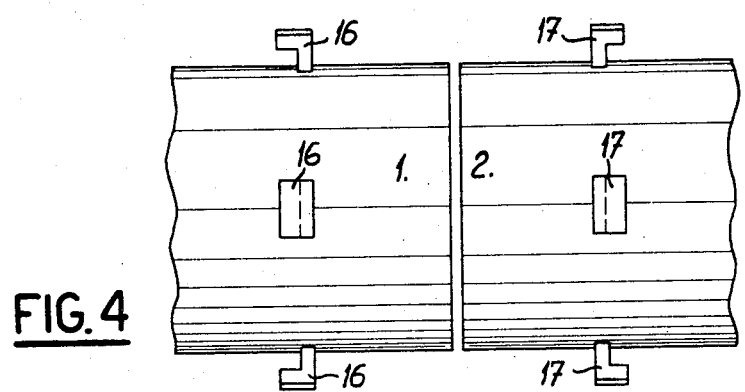
FIG. 4 shows a variant of the locking means of the fitting.

The embodiment shown in FIG. 4 is similar to the one shown in FIG. 1, the pairs of abutments 16, 17 presenting different shapes. The sleeve 3 and its casing 12 are not shown in that figure, nor is the coupling member which is similar to the one shown in FIG. 2.

Figure 5:
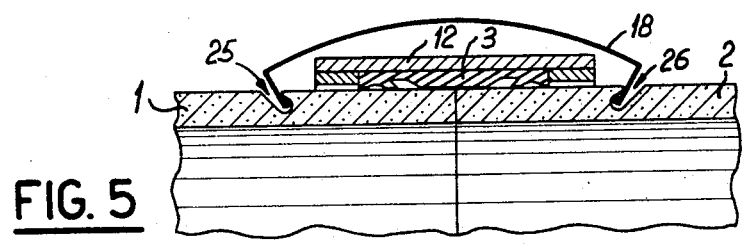
FIG. 5 shows a fourth embodiment of the fitting.

Finally the embodiment shown in FIG. 5 is similar to the one shown in FIG. 3, the shape of the coupling members 18 being different and their ends resting in pairs of formations 25, 26 provided in the peripheral surface of the pipes 1, 2 and replacing the grooves 23, 24.

Figure 6:
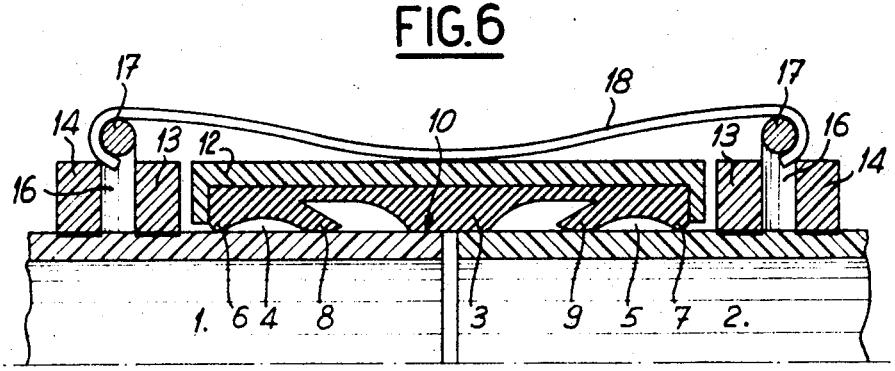
FIG. 6 is in longitudinal partial cross section of the fitting.
Figure 7:
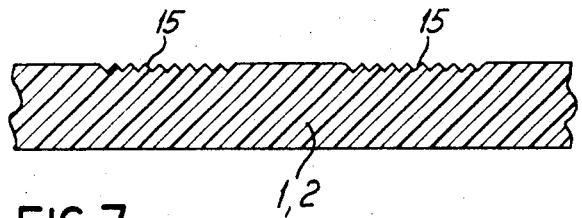
FIG. 7 shows the end of the pipes to be coupled before it receives the locking means.
Figure 8:
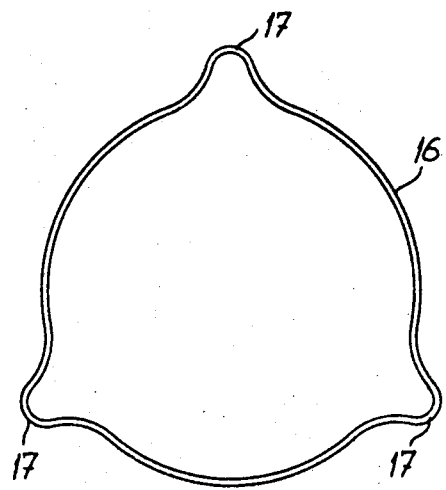
FIG. 8 shows the crown of the locking means.

The fitting shown in FIGS. 6 to 8 comprises, mounted on the smooth adjacent ends of two pipes 1, 2 a sleeve of resilient material 3 such as described previously.

The resilient sleeve is also mounted first in a casing 12, in order to constitute only one composite element which is then slipped over the ends of the pipes 1, 2.

The locking means comprise near the ends of each pipe having to be coupled, two rings of plastic material 13 and 14 defining a groove between themselves. In coupled service position of the pipes, the outside rings 14 are each located in the immediate vicinity of one end of the casing 12 housing the resilient sleeve 3. The casing 12 could be constituted by a piece of pipe of plastic material slipped onto the resilient sleeve 3. In coupled position this tube comes to rest against the outside rings 14 of the two pipes 1, 2. The pipes 1, 2 being also of plastic material their fastening to the rings may be made by soldering and gluing or any other known means. However a particularly simple and efficient way to fasten these rings is their hot fitting onto the tubes. One warms up the rings 13, 14 which enables one to widen them radialy to slide them over the ends of the pipe. Then they are left to cool causing their shrinkage and their fastening onto the pipe.

To ensure a better fastening of these rings 13, 14 onto the pipes 1, 2, particularly to avoid any risk of sliding of the rings along the pipes, one may provide, as shown in FIG. 2, the outside surfaces of the pipes 1, 2 with annular grooves 15 at the places where the rings have to be fastened.

In the groove provided between the two rings 13, 14 a crown 16 of piano steel is housed, shown in FIG. 3, comprising portions extending outwardly to constitute anchoring hooks 17 which are three in number in the example shown.

The locking device comprises finally connecting members 21, three in number in the example shown, connecting two hooks 17 of two crowns 19 each mounted on one end of one of the pipes 1, 2. These coupling members 18 are slightly bent in order to present a certain resiliency and to exert a regular pressure in the direction of the axis of the pipes on the casing 12 of the joint.

In a variant of the embodiment shown in FIG. 4, the coupling member could be constituted by a non-resilient connection connecting the abutments 16 and 17 of a same pair.

The coupling members may be constituted by two half shells resting against the abutments fast on the pipes and surrounding the sleeve 3 and the casing 12.

We claim:

1. A pipe joint connecting smooth-ended plastic pipes for underwater use, comprising a sleeve of resilient material fitted on the adjacent smooth ends of two plastic pipes, the sleeve having, at each of its ends, a circular throat having, in longitudinal section, a concave portion bounded by two lips, the edges of the lips being disposed on circles of smaller diameter than the outside diameter of the pipes in the undeformed condition of the lips, the lips being in contact with and resiliently deformed by the outer surface of the pipes, the sleeve having at its central zone a portion of a thickness greater than the thickness of the sleeve adjacent said lips, said portion having an inner cylindrical surface of circular cross section having a diameter corresponding to the outside diameter of the pipes and contacting the outer surface of the pipes on either side of the zone in which the pipes most closely approach each other, a casing inside of which the resilient sleeve is housed, and readily detachable coupling means releasably retaining the pipe ends in the sleeve, said coupling means comprising abutments secured to each pipe and in contact with opposite ends of said casing, the distance separating the frontal face of each abutment and the end of the corresponding pipe being less than half the length of the casing but greater than half the length of the casing diminished by half the length of said central thickening of the sleeve, said coupling means further comprising members detachably bearing against and interconnecting surfaces of said abutments on said pipes which are remote from said casing.

2. A pipe joint as claimed in claim 1, said members being steel blades having ends extending radially inwardly of said pipes.

3. A pipe joint as claimed in claim 2, said blades bearing resiliently against said casing only at the mid-portions of said blades.

4. A pipe joint as claimed in claim 1, said abutments comprising a plurality of pairs of abutments peripherally spaced apart about the periphery of the pipes, the abutments of each pair being disposed in the same radial plane.

5. A pipe joint as claimed in claim 1, said surfaces being radially inwardly inclined so that said surfaces radially outwardly diverge from each other.

* * * * *